United States Patent [19]

Heule

[11] 4,140,432
[45] Feb. 20, 1979

[54] DEBURRING TOOL

[76] Inventor: Heinrich Heule, Kristallstrasse 6, Au, Switzerland, CH 9434

[21] Appl. No.: 845,075

[22] Filed: Oct. 25, 1977

[30] Foreign Application Priority Data

Oct. 28, 1976 [DE] Fed. Rep. of Germany ....... 2649208

[51] Int. Cl.² ............................................. B23B 51/00
[52] U.S. Cl. .................................... 408/154; 408/147; 408/157
[58] Field of Search .............. 408/147, 153, 154, 155, 408/156, 157

[56] References Cited

U.S. PATENT DOCUMENTS

| 1,322,248 | 11/1919 | Lechnyr et al. | 408/154 |
| 3,973,861 | 8/1976 | Sussmuth | 408/154 |

FOREIGN PATENT DOCUMENTS

| 2407269 | 8/1975 | Fed. Rep. of Germany | 408/154 |
| 2525872 | 12/1976 | Fed. Rep. of Germany | 408/154 |

Primary Examiner—Harrison L. Hinson

Attorney, Agent, or Firm—Emrich, Root, O'Keeffe & Lee

[57] ABSTRACT

The deburring and reaming tool of this invention has a housing with a rotatable driven or supporting member that engages one end of a torsional-compression spring, the other end of which engages a reciprocatable, rotatable intermediate member having radially off-set lugs or projections that are engagable with slots in a pair of side-by-side cutter members slidable carried transverse the other end of the housing for simultaneous extension and retraction. Means are provided in the housing to adjust and limit the degree of rotation of the intermediate member and to extend and retract the intermediate member and its lugs or projections into and out of engagement with the slots in the cutter members. The tool provides a controllable and substantially constant resilient force holding the cutter members into engagement with the bore of the work piece, irrespective of changing diameters of the bore and controllable and substantially constant rigid force on the cutter members in the presence of burrs to be removed in the first and last portions of the bore to be reamed.

11 Claims, 6 Drawing Figures

DEBURRING TOOL

BACKGROUND OF THE INVENTION

From German Specification laid open to inspection No. 2,407,269 such a tool is known in which a coiled spring lies in the receiver between the two cutter members and thereby presses them outwardly. This construction however has the disadvantage that the spring force and thus the cutting force of the cutting members is dependent on the diameter of the respective bore to be deburred. This rests on the fact that with smaller bores the cutting members are pressed inwards so that in the working state the spring force is greater than with larger bores in which the cutter members are located further outwards.

A further problem in the deburring of passage bores consists in that the tool has to overcome a comparatively great cutting resistance if the tool is to remove the first burr of the bore. It would be ideal if the deburring tool upon removal of the first burr in the bore has a comparatively large constant spring force, that is, is practically rigid and which following thereon springs softly into the bore so that an actual de-burring also takes place on both sides in the passage bores. This problem is also not solved with the known tool above described.

The object of the invention is therefore to cushion the cutting members such that at the beginning of the entry into the bore and at the outlet they are practically rigid, that is, are only slightly cushioned in order to remove the first and last burr and the sharp edge of the passage bore with certainty and when the cutting members then enter the bore to provide very soft and uniformly cushioned spring force, independently of whether the passage bore has a large or small diameter.

As distinguished from from a tool of the type mentioned above the instant tool is successful according to the invention in that the spring operates as of a sprung crank slide.

Due to these features the bore is de-burred and smoothed to a very high quality. After overrunning the locking given by the spring constant binding, the cutter members need no longer be adjusted for the specified work area. The cutter members are during the deburring in the position in which they were ground which ensures that there is no profile distorsion and good results.

A practical example with which the desired suspension of the cutting members is obtained is characterised in that a torsion spring is on the one hand fixed firmly to the housing and on the other hand engages in an intermediate member rotatable in a bore, which intermediate member engages with projections free of play in recesses in the cutting members.

Independently of the angle which is formed between the projections and the path of displacement of the cutting members in their slots a crank-slide-like suspension characteristic is obtained. In addition both cutter members can be adjusted together because one and the same spring causes the engagement of both cutter members through the intermediate members.

For the setting of the adjusting path of the cutter members to different diameters it is preferred to provide an adjusting screw actuated by means of outside contacts or tools, the tip of which contacts the face of the intermediate member. Thus also the path of adjustment in both cutter members is adjusted at the same time through one and the same adjusting screw.

The exchanging of the two cutter members is made particularly simple by providing one screw with an eccentric projection which engages in recess in the intermediate member. By a rotation of the screw, in one direction, the intermediate member is pushed into its bore in an axial direction so that extensions on the intermediate member are brought into engagement with recesses in the cutter members and rotating of the screw in the other direction causes the extensions to come out of the recesses for removal of the cutter members. By a simple rotation of this screw therefore an exchanging of the cutter members is possible.

The invention will be described with reference to the accompanying drawings.

Figure 1:
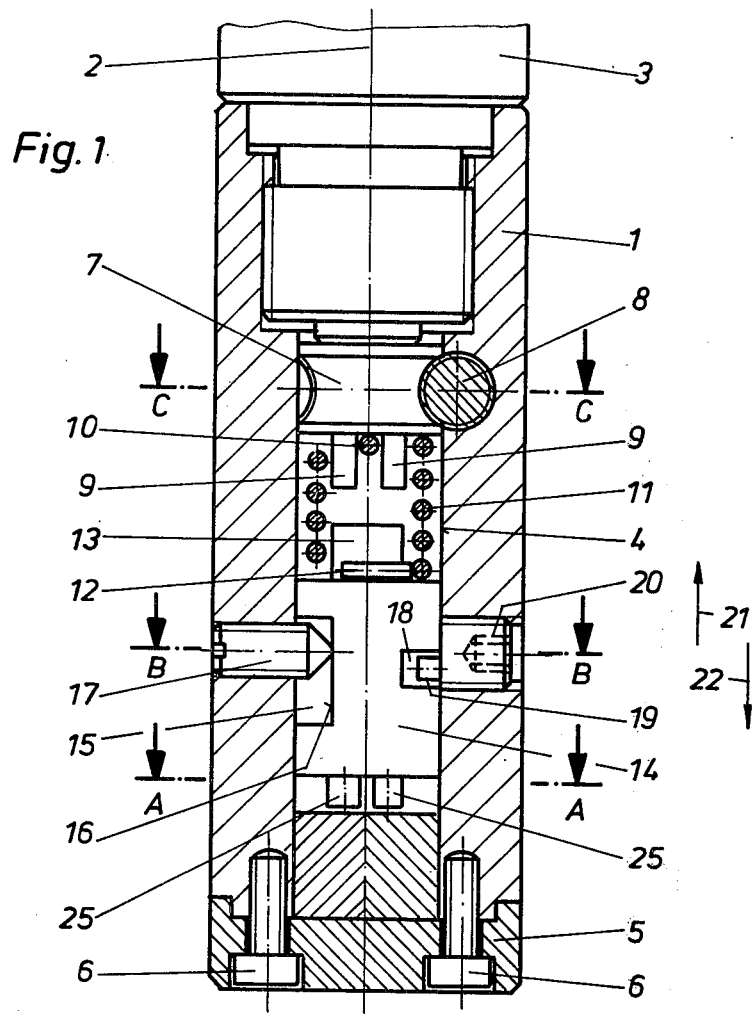
FIG. 1 shows a centre longitudinal section through the essential constructional elements of a tool according to the invention.

The tool has a cylindrical housing 1 which may be driven about its longitudinal axis 2 in known manner e.g. by means of a mandrel 3. In the housing 1 there is provided a bore 4 running in longitudinal direction which is open downwards. The bore is closed by a lid 5 which is screwed either onto the housing 1 or is detachably connected to the housing by studs 6.

Figure 4:
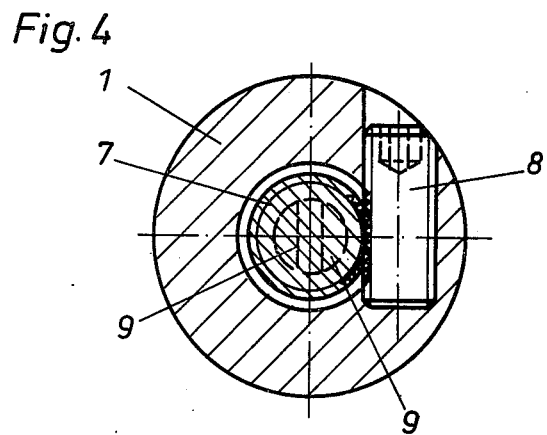
FIG. 4 is a section on line C—C of FIG. 1.

In the upper part of the bore 4 a supporting member 7 is rotatably mounted which has teeth on its outer periphery. A thread of an adjusting screw 8 meshes with the teeth (compare also FIG. 4). On actuating the adjusting screw 8 therefore the supporting member 7 is adjusted about its longitudinal axis 2. On its underside the supporting member 7 has two projections 9 which clamp between them the inwardly projecting end 10 of a torsion spring 11. By adjustment of the adjusting screw 8 the tension of the torsion spring is adjusted.

Figure 3:
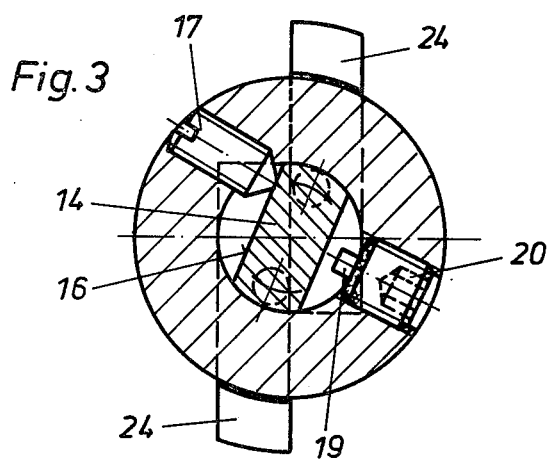
FIG. 3 is a section on line B—B of FIG. 1.

The other end 12 of the torsion spring also projects inwardly and is similarly clamped between the projections 13 of an intermediate member 14 which is rotatably held in the bore 4 about the longitudinal axis 2. FIG. 1 shows only one of the two projections 13. The intermediate member 14 has in its central region a recess 15 with a plain contact edge 16 (see also FIG. 3) on which the tip of an adjusting screw 17 contacts. The screw 17 extends through the side wall of the housing so that is outer face can be engaged by a suitable tool to extend and retract the screw and control the degree of rotation of the intermediate member. The screw 17 (as seen in FIG. 3) is off-set from the center of the edge or inside 16 of the recess 15. The top and bottom walls of the recess 15 are normally spaced from the screw 17 (as illustrated) to allow reciprocation of the intermediate member as will be described.

Opposite the recess 15 lies a smaller recess 18 in the intermediate member in which an eccentric projection 19 of a screw 20 engages which, like screw 17, extends through the side wall of the housing for rotation of the eccentric from outside. On rotation of the screw 20 the intermediate member 14 is therefore adjusted axially of the base 4 through the eccentric projection 19 in the direction of the arrow 21 or 22. For purposes of limiting the upward adjustment of the apparatus the upper edge of the projections 13 forms a stop on the under edge of the projections 9. For purposes of limiting the downward adjustment, the recesses 23 in cutter members 24 forms a stop against the projections 25.

Figure 2:
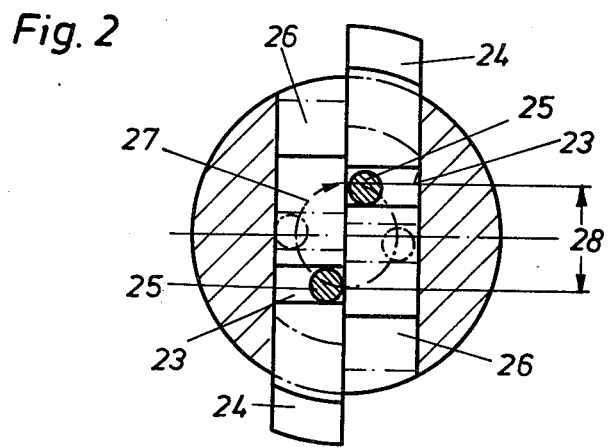
FIG. 2 is a section on line A—A of FIG. 1.
Figure 6:
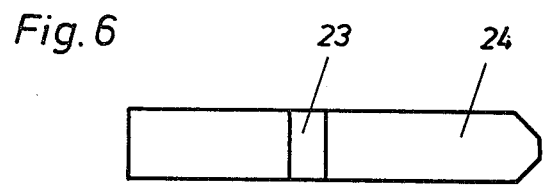
FIG. 6 shows a plan view of the cutter member.
Figure 5:
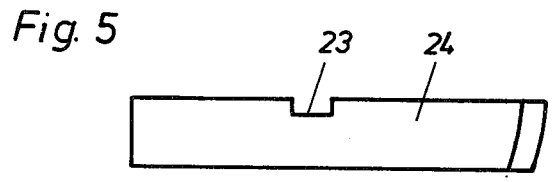
FIG. 5 shows a side view of a cutter member.

The lower end of the intermediate member 14 has two projections 25 which engage free of play in the said recesses 23 of the cutter member 24 when the intermediate member 14 is located in its lower position (see also FIGS. 2, 5 and 6).

FIG. 2 shows a position of the intermediate member 14 and of the cutter members 24 connected power-locking relationship to it in the full down position of the eccentric 19 via the projections 25 in which for a displacement of the cutter member in their slots 26 which run substantially radially the action of the tension spring 11 is relatively gentle.

Only when the projections 25 on displacement along their arc of a circle 27 have reached a position in which the cutter member 24 are displaced inwards on an adjustement path 28 which is equal to the diameter of the arc of the circle 27 the spring contstant becomes large because the dead point of the spring suspension has been reached and the spring suspension is practically rigid.

The desired spring suspension characteristic is therefor very simply obtained by the constructional design similar to a crank slide. The torsion spring 11 has a comparatively long spring path which guarantees that with bores of small and large diameter there is practically the same spring pressure over the whole working range. In the position shown in FIG. 2 the dead centre is again reached in which the knives are supported practically rigidly. In this position of the projections 25 shown in broken lines in FIG. 2 the spring suspension is very gentle. When the dead centre is drawn in is overcome a displacement along the arc of the circle 27 by a few tenth m.m. suffices until the gentle spring suspension is used. For the adjusting of the path to different diameters the adjusting screw 17 is correspondingly adjusted which determines the displacement along the arc of the circle 27 in that it contacts with its point on the contact edge 16 outside the longitudinal axis 2.

For changing the knives the screw 20 is turned until the projections 25 come out of the recesses 23 so that both cutter members can be drawn out of their slots 26. After the exchange new cutter members may be inserted into the slots receivers 26 which are enclosed by rotation of the screw 20 which brings the projections 25 again into engagement in the recesses 23.

It is also important for the adjustement of the cutter members that only a single screw 17 is necessary due to the use of a single intermediate member for the adjustment of both cutter members.

What is claimed is:

1. A deburring tool and reaming tool comprising:
   an elongated housing defining a longitudinal bore,
   support means rotatably mounted within said bore and defining a slotted opening at one end,
   means supported by said housing to rotate said support means to a series of locked positions,
   an intermediate member rotatably and reciprocatably mounted within said bore, said intermediate member defining a slotted opening at one end opposed to and spaced from the slotted opening in said support means,
   torsion spring means arranged longitudinally in said bore and having its end portions engagable within the respective slotted openings of said support means and said intermediate member,
   control means supported by said housing adjustably engagable with said intermediate member at a radially off-set point from its axis of rotation to control the limits of rotation,
   a transverse guide slot defined by said housing,
   a pair of cutter members slidably supported within said guide slot for outward and inward displacement,
   radially off-set cam means carried by the other end of said intermediate member for relative engagement with said cutter members and
   eccentric means carried by said housing for engagement with said intermediate member to reciprocate same within said bore and selectively engage and disengage said cam means with said cutter members, whereby rotation of said support member to a selected locked position imparts a torque on said spring means and rotates and axially extends said intermediate member causing said cam means to engage said cutter members and simultaneously displace said cutter members into controlled resilent cutting action with a work piece within the limits set by said rotation control means.

2. A deburring and reaming tool comprising:
   an elongated housing defining a longitudinal bore,
   support means rotatably mounted within said bore,
   Torsion spring means arranged longitudinally within said bore and engagable at one end for rotation with said support means, and intermediate member rotatable and reciprocatably mounted within said bore and engagable at one end with the other end of said Torsion spring means,
   means adjustably supported by said housing and engagable with said intermediate member to control the limits of rotation thereof,
   a pair of cutter members supported by said housing for outward and inward radial displacement, and
   radially spaced projection means extending from the other end of said intermediate member for selective engagment with said cutter members, adapted to simultaneously displace said cutter members upon rotation of said support means.

3. A deburring and reaming tool in accordance with claim 2 including;
   means to rotate said support means to a series of locked positions and thereby adjust the rotational torque imparted by said torsion spring upon said intermediate member and said cutter members.

4. A deburring and reaming tool in accordance with claim 3 in which:
   said support means includes circumferential gear means,
   said means to rotate said support means to a series of locked positions comprises an adjusting screw supported by said housing and engaging said gear means.

5. A tool in accordance with claim 2 in which:
   said spring means comprises a coil spring having its end portions extending diametrically of said bore,
   said support means includes a pair of radially spaced projections adapted to engage on opposite sides of one said end portions of said coil spring and, said intermediate member includes a pair of radially spaced projections adaped to engage on opposite sides of the other said end portions of said coil spring.

6. A tool in accordance with claim 5 in which:

said pairs of projections are longitudinally opposed and normally spaced end-wise from each other and adapted to limit the axial reciprocation of said intermediate member upon axial compression of said coil spring by end-to-end contact.

7. A tool in accordance with claim 2 in which:

said outer surface defining a first recess with a bottom planar contace surface, and, said adjustable means engagable therewith to limit the angle of rotation of said intermediate portion comprises an adjusting screw carried through said housing and having its inner end engagable with one end of said contact surface on a diametrically off-set axis.

8. A tool in accodance with claim 2 in which: said intermediate member is essentially cylindrical and the outer surface thereof is received by said bore in guided rotatable and longitudinally reciprocatable relationship, said outer surface of said intermediate member defines a second recess having opposed axially spaced walls and means engagable with said second recess are provided to limit the length of reciprocation of said intermediate member comprises a rotatable member carried through said housing and having an eccentric inner end engagable between said opposed walls, one position of said eccentric extends said projection means into engagement with said cutter members and a second position said eccentric retracts said projection means therefrom.

9. A tool in accordance with claim 2 in which:

said cutter members each include an opening facing said intermediate member, said openings being engagable with said projections on the other end of said intermediate member in a close-fitting crank-slide relationship.

10. A tool in accordance with claim 2 in which:

said housing defines a transverse open-end guide slot and, said cutter members are slidably received in said guide slot for outward and inward radial displacement upon rotation of said intermediate member.

11. A tool in accordance with claim 10 in which:

said guide slot is open-bottomed, said cutter members are received therein in side-by-side contiguous sliding contact with each other and, a detachable lid member is provided to enclose the open bottom of said slot.

* * * * *